United States Patent [19]

Acevedo et al.

[11] Patent Number: 5,430,085
[45] Date of Patent: Jul. 4, 1995

[54] THERMALLY AND ELECTRICALLY CONDUCTIVE CAULK

[75] Inventors: Joaquin R. Acevedo, Westminster; Jack D. Mackey, Hawthorne, both of Calif.

[73] Assignee: Northrop Grumman Corporation, Los Angeles, Calif.

[21] Appl. No.: 346,818

[22] Filed: Nov. 30, 1994

[51] Int. Cl.$^6$ .................... C07C 303/00; C08K 3/04
[52] U.S. Cl. .................... 524/495; 252/511; 524/493; 524/496
[58] Field of Search ............. 252/511; 524/493, 495, 524/496

[56] References Cited

U.S. PATENT DOCUMENTS

| | | | |
|---|---|---|---|
| 4,157,327 | 6/1979 | Martin et al. | 260/42.27 |
| 4,382,024 | 5/1983 | Seaman et al. | 252/511 |
| 4,395,362 | 7/1983 | Satoh et al. | 252/511 |
| 4,931,479 | 6/1990 | Morgan | 521/76 |

*Primary Examiner*—Morton Foelak
*Attorney, Agent, or Firm*—Terry J. Anderson; Karl J. Hoch, Jr.

[57] ABSTRACT

A thermally and electrically conductive caulk having a resin is mixed with a filler mixture which includes 80% by weight large thermally and electrically conductive particles having a particle size within a range of about 300-325 microns, 10% by weight fine thermally and electrically conductive particles having a particle size within a range of about 75-80 microns, and 10% by weight thermally and electrically conductive fibers having a length within a range of about 0.020-0.025 inches. The percentage by weight of filler mixture to resin is optimized such that thermal and electrical conductivity is maximized, while still maintaining desired mechanical properties of the caulk once cured. Preferably, the thermally and electrically conductive particles and fibers are made of carbon. In addition, it is preferred that the large thermally and electrically conductive particles have a particle size of approximately 325 microns, the fine thermally and electrically conductive particles have a particle size of approximately 75 microns, and the thermally and electrically conductive fibers have a length of approximately 0.020 inches. This caulk exhibits a high thermal and electrical conductivity because the differently sized particles result in close packing of the particles in the resinous material making up the remainder of the caulk. Additionally, the thermal and electrical conductivity of the caulk is retained when the caulk is flexed or thermally expanded because of the short fibers employed in the filler material. The carbon fibers maintain contact between particles which have been pulled apart due to the aforementioned flexing or expansion.

12 Claims, 1 Drawing Sheet

THERMALLY AND ELECTRICALLY CONDUCTIVE CAULK

BACKGROUND OF THE INVENTION

1. Technical Field

This invention relates to thermally and electrically conductive caulking compounds and a process for making these compounds.

2. Background Art

Conductive caulks are made by incorporating thermally and/or electrically conductive fillers into a resin base material. Typically, these conductive fillers are uniformly sized particles. It has been found that the degree of thermal or electrical conductivity in these prior art caulks is dependent on the amount of filler that can be incorporated into the resin. Therefore, the packing factor of the filler material is of great importance. The more tightly the filler material can be packed in the resin, the higher the resulting conductivity. The theoretical maximum loading of prior art uniformly sized conductive particles into a resin base material would occur when each particle is surrounded by and in contact with as many other particles as their physical size will allow. FIG. 1 is exemplary of this maximum packing condition for uniformly sized particles 10 where the normally irregularly shaped particles are represented by spheres.

It has also been found that the thermal and electrical conductivity of a resin matrix caulk employing uniformly sized particles tends to change when flexed, or when the material expands due to external temperature increases. This change occurs because in both flexing and expanding the caulk, the filler particles are pulled apart, thereby reducing the contact between adjacent particles which is responsible of the high conductivity of the material.

Therefore, what is needed is a caulk having high thermal and electrical conductivity, and which substantially retains this conductivity when flexed or expanded.

SUMMARY

Wherefore, it is an object of the present invention to provide a carbon-based caulk having high thermal and electrical conductivity.

Wherefore, it is another object of the present invention to provide a carbon-based caulk which substantially retains its high thermal and electrical conductivity when flexed or expanded.

The foregoing objects have been attained by a thermally and electrically conductive caulk where a resin is mixed with a filler mixture. The filler mixture includes 80% by weight large thermally and electrically conductive particles having a particle size range of about 300–325 microns, 10% by weight fine thermally and electrically conductive particles having a particle size within a range of about 75–80 microns, and 10% by weight thermally and electrically conductive fibers having a length within a range of about 0.020–0.025 inches. The percentage by weight of filler mixture to resin is optimized such that thermal and electrical conductivity is maximized, while still maintaining desired mechanical properties of the caulk once cured.

Preferably, the thermally and electrically conductive particles and fibers are made of carbon. In addition, it is preferred that the large thermally and electrically conductive particles have a particle size of approximately 325 microns, the fine thermally and electrically conductive particles have a particle size of approximately 75 microns, and the thermally and electrically conductive fibers have a length of approximately 0.020 inches.

The above-described caulk exhibits a high thermal and electrical conductivity because the disclosed size ranges result in close packing of the particles in the resinous material making up the remainder of the caulk. These differently sized particles can be packed much closer together than the uniformly sized particles typical of the prior art. In addition, the preferred carbon particles and fibers are chosen to have the desired high conductivity characteristics to further enhance the conductivity of the cured caulk. Additionally, retaining the thermal and electrical conductivity of the caulk when flexed or thermally expanded results from incorporating short fibers in the filler material. The carbon fibers maintain contact between particles which have been pulled apart due to the aforementioned flexing of expansion.

Accordingly, it can be seen that all the stated objectives of the invention have been accomplished by the above-described embodiments of the present invention. In addition, other objectives, advantages and benefits of the present invention will become apparent from the detailed description which follows hereinafter when taken in conjunction with the drawing figures which accompany it.

DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described with reference to the drawings.

High thermal and electrical conductivity is dependent upon a high loading percentages of the particles in the resinous material making up the remainder of the caulk, and the conductivity characteristics of the particles themselves. High loading percentages require a close packing between the particles in the resinous material. This close packing is achieved through the use of particles having distribution of sizes. Additionally, retaining the thermal and electrical conductivity of the caulk when flexed or thermally expanded requires that contact between the filler materials be substantially maintained. This is accomplished by incorporating shod fibers in the filler material. It is preferred that the particles and fibers employed in the filler material be made of a high thermally and electrically conductive carbon.

Figure 2B:
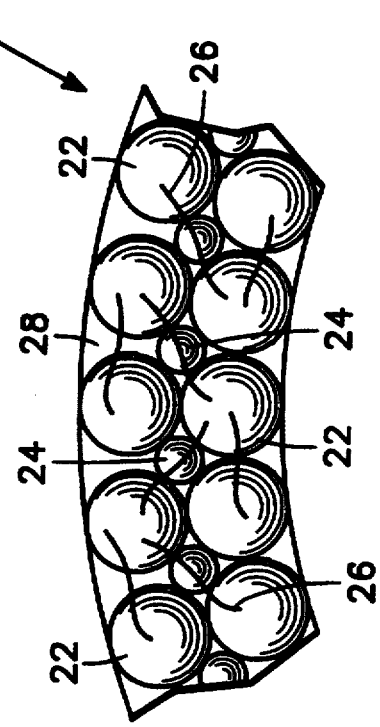
FIG. 2B shows the cross-sectional view of FIG. 2A in a flexed condition.
Figure 1:
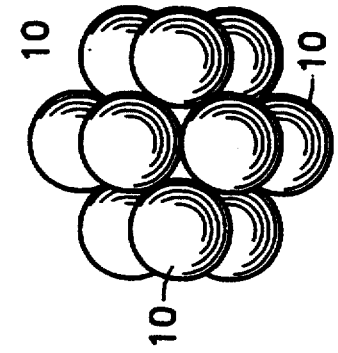
FIG. 1 is an exemplary illustration showing a possible maximum packing condition uniformly sized particles typical of prior art thermally and electrically conductive fillers, as represented by spheres.
Figure 2A:
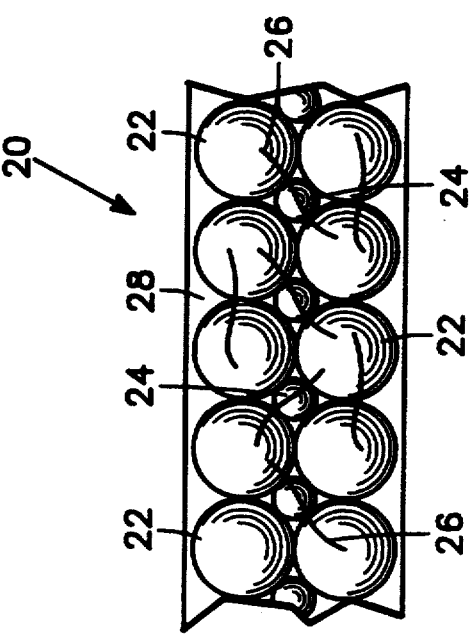
FIG. 2A is a cross-sectional view of a caulk compound made in accordance with the present invention showing two differently sized thermally and electrically conductive particles and thermally and electrically conductive fibers loaded into a resin material.

FIG. 2A shows a cured caulk 20 in accordance with the present invention which employs two differently sized carbon particles 22, 24 and fibers 26 as the filler in a resin base material 28. As can be seen in this figure, the differently sized carbon particles 22, 24 allow for a denser packing and more contact between adjacent particles. FIG. 2B shows this same material after being flexed. As can be seen in FIG. 2B, the carbon fibers 26 maintain contact between particles which have been pulled apart. Thus, the thermal and electrical conductivity of the caulk 20 is substantially maintained.

It is specifically preferred that the carbon filler include larger carbon particles having a particle size of approximately 325 microns, fine carbon particles having a particle size of approximately 75 microns, and carbon fiber having a length of approximately 0.020 inches. The carbon particles are preferably mixed in the following proportions by weight: 80% large particles, 10% fine particles, and 10% carbon fibers. This mixture provides for the optimum packing between particles. The carbon filler mixture is combined with a resinous material to form the caulk. This resinous material can be any appropriate for the application in which the caulk is to be used. The mixing process employed should be any one of the well known methods of mixing resin matrix materials such that air bubbles are not entrapped in the mixture. For instance, devices employing a vacuum chamber for mixing would be appropriate. Generally, the more of the carbon filler mixture loaded into the resin, the higher the thermal and electrical conductivity, up to the point at which the carbon particles are packed as tightly as their physical size will permit. However, at some point, the mechanical properties of the cured caulk may be degrade due to the increasing percentage of carbon filler. Therefore, it is preferred that as much of the carbon filler mixture be added to the resin as is possible while still maintaining the desired mechanical properties of the cured caulk. The caulk is cured after application in accordance with methods appropriate for the type of resin employed. For instance, some resin materials require the application of heat or ultraviolet light to cure, while other cure over time at room temperature.

In a tested embodiment of the present invention, the aforementioned preferred carbon filler mixture was incorporated into a silicone resin by the aforementioned methods. The larger 325 micron carbon particles were made by milling No. 04144-56 carbon electrodes manufactured by Ultra Carbon Corporation of Bay City, Mich. and having an ultra "F" purity, as designated by the manufacturer. The milled particles were then sifted through a No. 50 filter screen having 0.0117 inch openings. This milling and sifting process ensured particles no larger than the preferred size of 325 microns were used in the filler mixture. The fine 75 micron carbon particles were obtained from the same manufacturer as the aforementioned carbon electrode. These particles were also made of ultra carbon with the same ultra "F" purity. The 0.020 inch long carbon fibers exhibit a low electrical and thermal resistance, and were obtained from Textron, Specialty Materials, of Lowell, Mass. These fibers have a preferred diameter of 7 to 8 microns.

Figure 3:
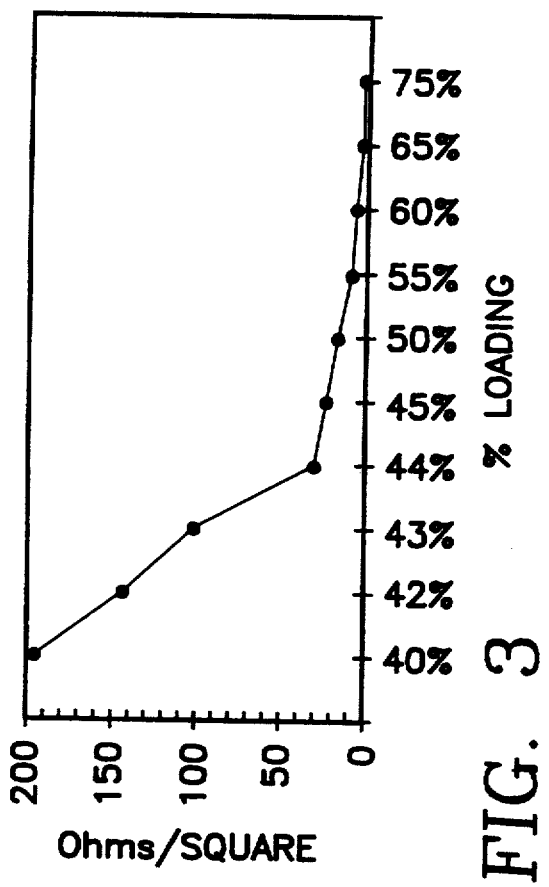
FIG. 3 is a table providing the electrical resistivity of test samples having various percentages of the carbon filler mixture to silicone resin.

Various amounts of the carbon filler mixture were added to the silicone resin and cured into 0.050 thick test specimens. The electrical resistivity of each specimen was determined. The results of this testing are shown in the table of FIG. 3. For instance, it has been found that a caulk made as described previously and having 65% by weight carbon filler mixture to silicone, produced a resistivity of 5.040 $\Omega/m^2$. Whereas, a loading factor of 75% filler to silicone produced a resistivity of 0.567 $\Omega/m^2$.

While the invention has been described in detail by reference to the preferred embodiment described above, it is understood that variations and modifications thereof may be made without departing from the true spirit and scope of the invention.

Wherefore, what is claimed is:

1. A thermally and electrically conductive caulk comprising:
   (a) silicone resin; and,
   (b) a filler mixture comprising,
      (b1) 80% by weight large thermally and electrically conductive particles having a particle size within a range of about 300–325 microns,
      (b2) 10% by weight fine thermally and electrically conductive particles having a particle size within a range of about 75–80 microns, and,
      (b3) 10% by weight thermally and electrically conductive fibers having a length within a range of about 0.020–0.025 inches.

2. The caulk according to claim 1, wherein:
a percentage by weight of filler mixture to resin is optimized such that thermal and electrical conductivity is maximized, while still maintaining desired mechanical properties of the caulk once cured.

3. The caulk according to claim 1, wherein:
the thermally and electrically conductive particles and fibers are made of carbon.

4. The caulk according to claim 1, wherein:
the large thermally and electrically conductive particles have a particle size of approximately 325 microns.

5. The caulk according to claim 1, wherein:
the fine thermally and electrically conductive particles have a particle size of approximately 75 microns.

6. The caulk according to claim 1, wherein:
the thermally and electrically conductive fibers have a length of approximately 0.020 inches.

7. A process for making a thermally and electrically conductive caulk comprising the steps of:
forming a compound by mixing together,
   (a) silicone resin; and,
   (b) a filler mixture comprising,
      (b1) 80% by weight large thermally and electrically conductive particles having a particle size within a range of about 300–325 microns,
      (b2) 10% by weight fine thermally and electrically conductive particles having a particle size within a range of about 75–80 microns, and,
      (b3) 10% by weight thermally and electrically conductive fibers having a length within a range of about 0.020–0.025 inches.
curing the caulk.

8. The process according to claim 7, wherein:
a percentage by weight of filler mixture to resin is optimized such that thermal and electrical conductivity is maximized, while still maintaining desired mechanical properties of the caulk once cured.

9. The process according to claim 7, wherein:
the thermally and electrically conductive particles and fibers are made of carbon.

10. The process according to claim 7, wherein:

the large thermally and electrically conductive particles have a particle size of approximately 325 microns.

11. The process according to claim 7, wherein:
the fine thermally and electrically conductive particles have a particle size of approximately 75 microns.

12. The process according to claim 7, wherein:
the thermally and electrically conductive fibers have a length of approximately 0.020 inches.

* * * * *